(12) United States Patent
Cabodi et al.

(10) Patent No.: US 12,704,327 B2
(45) Date of Patent: Aug. 11, 2026

(54) INSTRUMENTED PLATE FOR OVEN

(71) Applicant: SAINT-GOBAIN CENTRE DE RECHERCHES ET D'ETUDES EUROPEEN, Courbevoie (FR)

(72) Inventors: Isabelle Anne Cabodi, Cavaillon (FR); Olivier Citti, Cavaillon (FR); Christian His, Cavaillon (FR); Sébastien Pinson, Cavaillon (FR); Franceline Marguerite Villermaux, Cavaillon (FR); Gael Loic Marie Vuillermet, Cavaillon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 0 days.

(21) Appl. No.: 18/564,189

(22) PCT Filed: Jun. 8, 2022

(86) PCT No.: PCT/EP2022/065578
§ 371 (c)(1),
(2) Date: Nov. 27, 2023

(87) PCT Pub. No.: WO2022/258699
PCT Pub. Date: Dec. 15, 2022

(65) Prior Publication Data

US 2025/0314428 A1 Oct. 9, 2025

(30) Foreign Application Priority Data

Jun. 9, 2021 (FR) ..................................... 21 06067

(51) Int. Cl.
*G01D 11/30* (2006.01)
*C04B 35/80* (2006.01)
*F27D 21/00* (2006.01)

(52) U.S. Cl.
CPC .......... *F27D 21/0014* (2013.01); *C04B 35/80* (2013.01); *F27D 21/0021* (2013.01); (Continued)

(58) Field of Classification Search
CPC ................................................ C04B 35/71–83
See application file for complete search history.

(56) References Cited

U.S. PATENT DOCUMENTS 5,319,671 A * 6/1994 Hopf ................... F27D 21/0021 373/145
5,356,220 A * 10/1994 Iida ........................... C21B 7/24 374/161

(Continued)

FOREIGN PATENT DOCUMENTS

| EP | 1527306 | 5/2005 |
|---|---|---|
| EP | 2312250 | 4/2011 |
| WO | WO2021 116347 | 6/2021 |

OTHER PUBLICATIONS

International Search Report Dated Oct. 18, 2022.

*Primary Examiner* — Alexander A Mercado
(74) *Attorney, Agent, or Firm* — IPSILON USA, LLP

(57) ABSTRACT

An instrumented plate (300) intended for the monitoring of a refractory part of a furnace. The instrumented plate has a support plate (310) through which a plurality of orifices (304) pass and which is at least partially made of a material of fibers interconnected by a ceramic matrix, referred to as "ceramic-matrix composite", or of a precursor of said ceramic-matrix composite. The instrument plate has a sensor (312) borne by the support plate. A ceramic-matrix composite precursor is a material which is capable of transforming into the ceramic-matrix composite under the effect of heating.

17 Claims, 6 Drawing Sheets

(52) U.S. Cl.
CPC .......... *G01D 11/30* (2013.01); *C04B 2235/95* (2013.01); *C04B 2235/9607* (2013.01)

(56) References Cited

U.S. PATENT DOCUMENTS

2018/0195914 A1 7/2018 Benech et al.
2021/0308902 A1 10/2021 Cabodi et al.

* cited by examiner

[Fig 1]
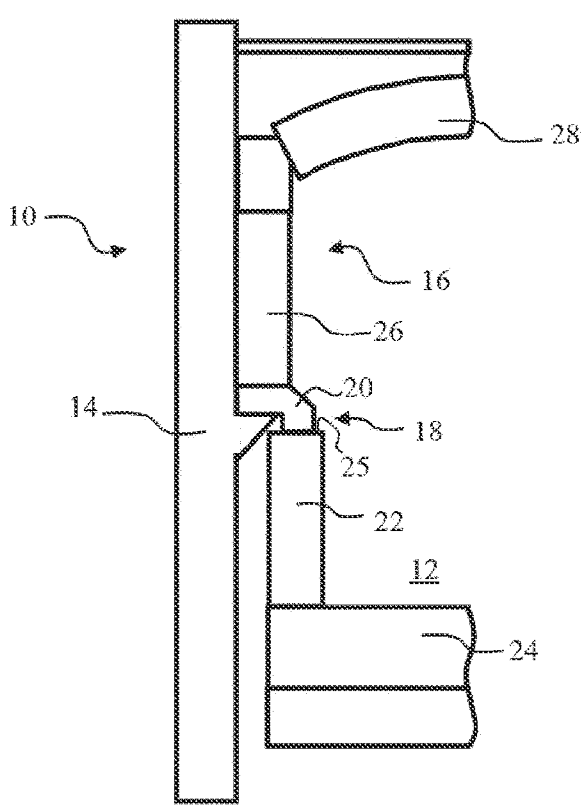
[Fig 2]
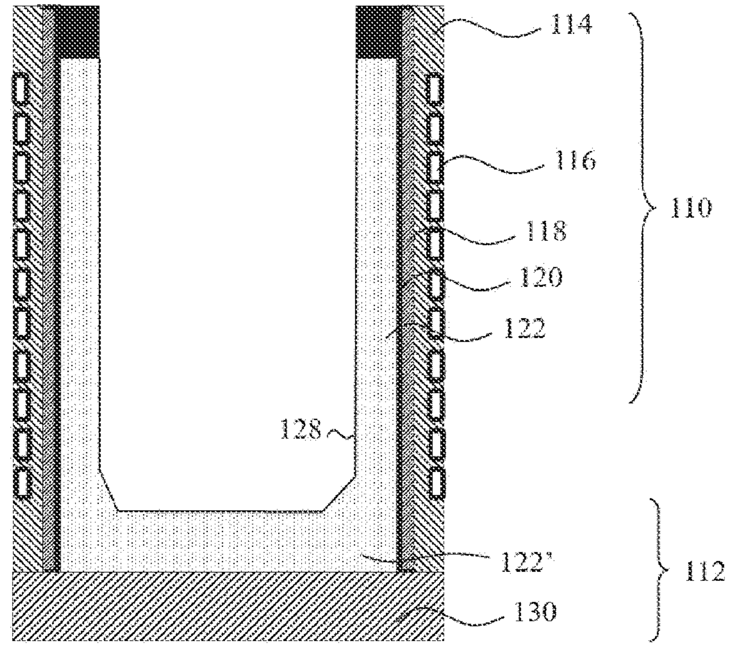

[Fig 3]
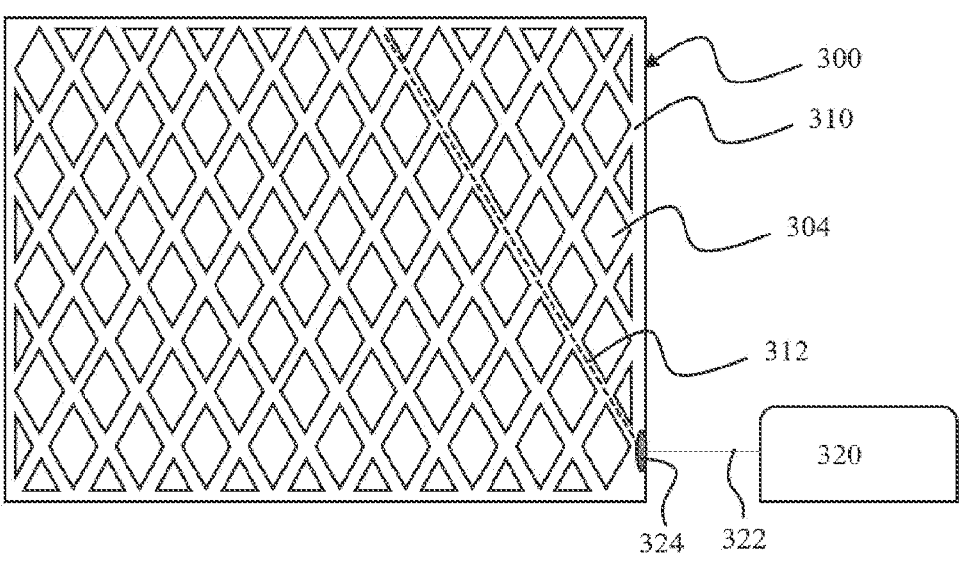
[Fig 4]
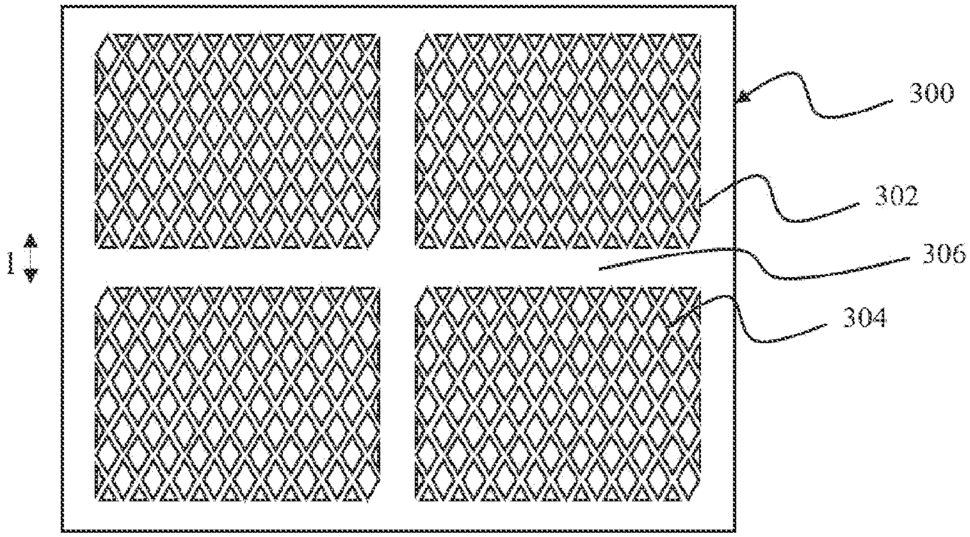

[Fig 5]
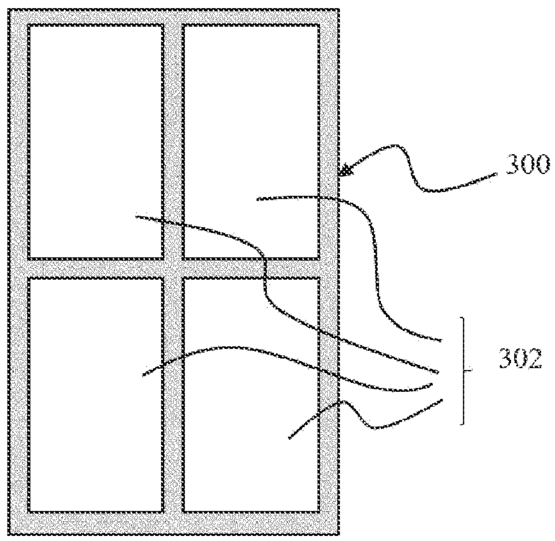
[Fig 6]
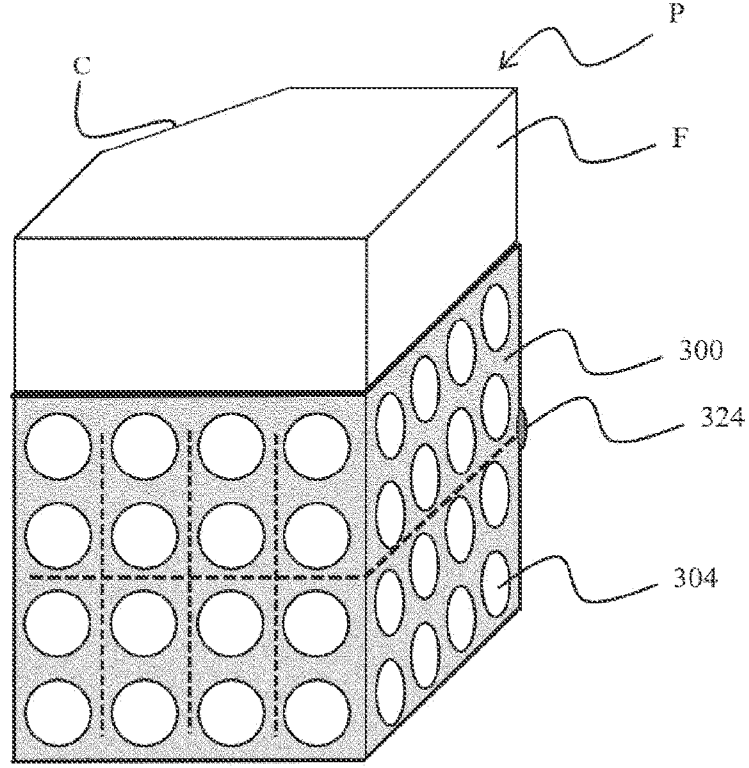

[Fig 7]
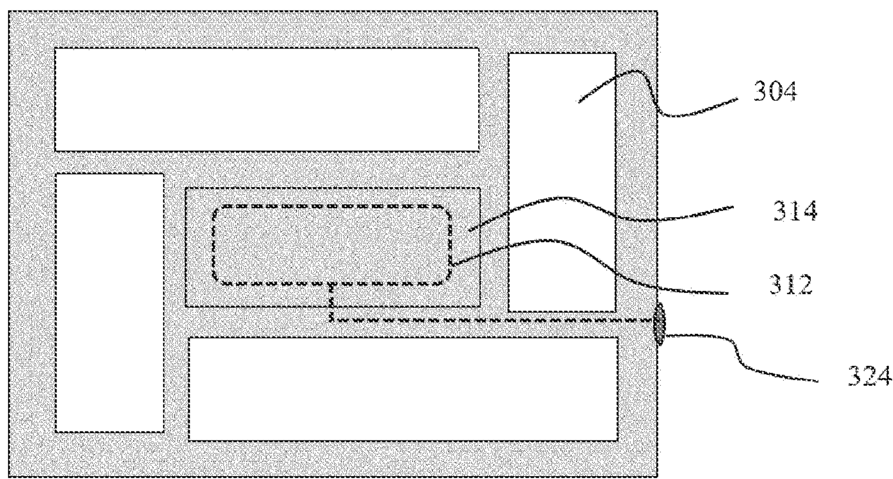
[Fig 8]
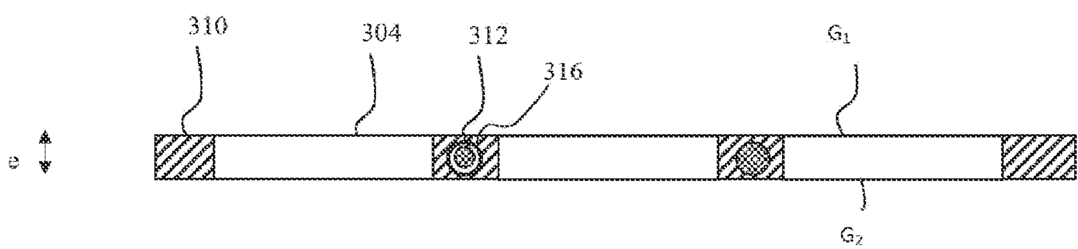
[Fig 9]
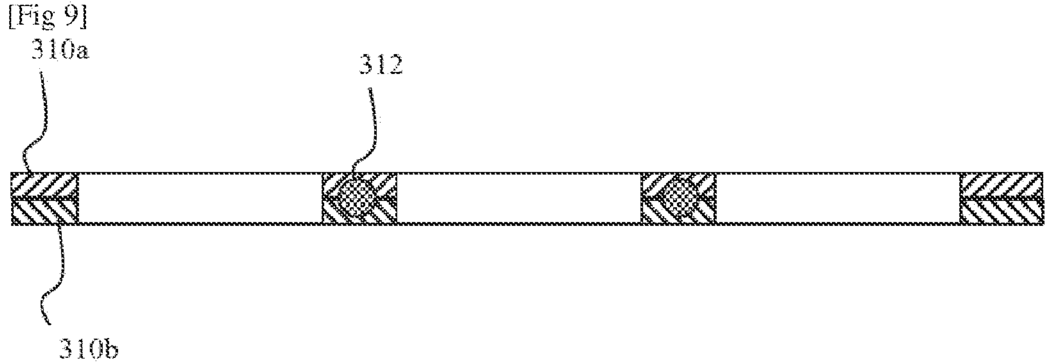

[Fig 10]
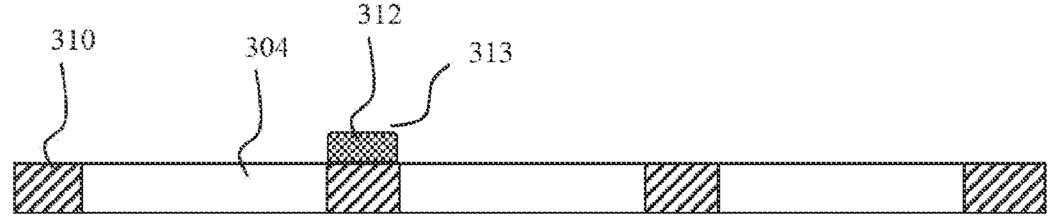
[Fig 11]
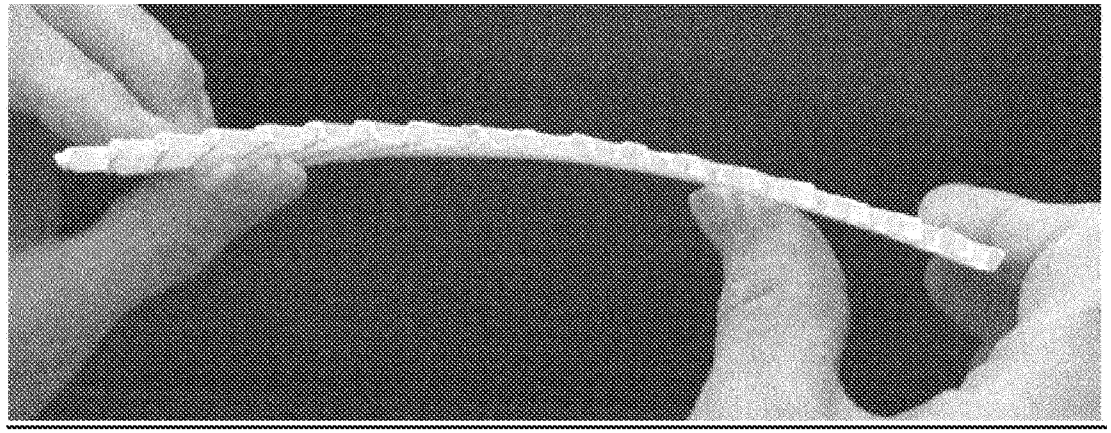

[Fig 12]
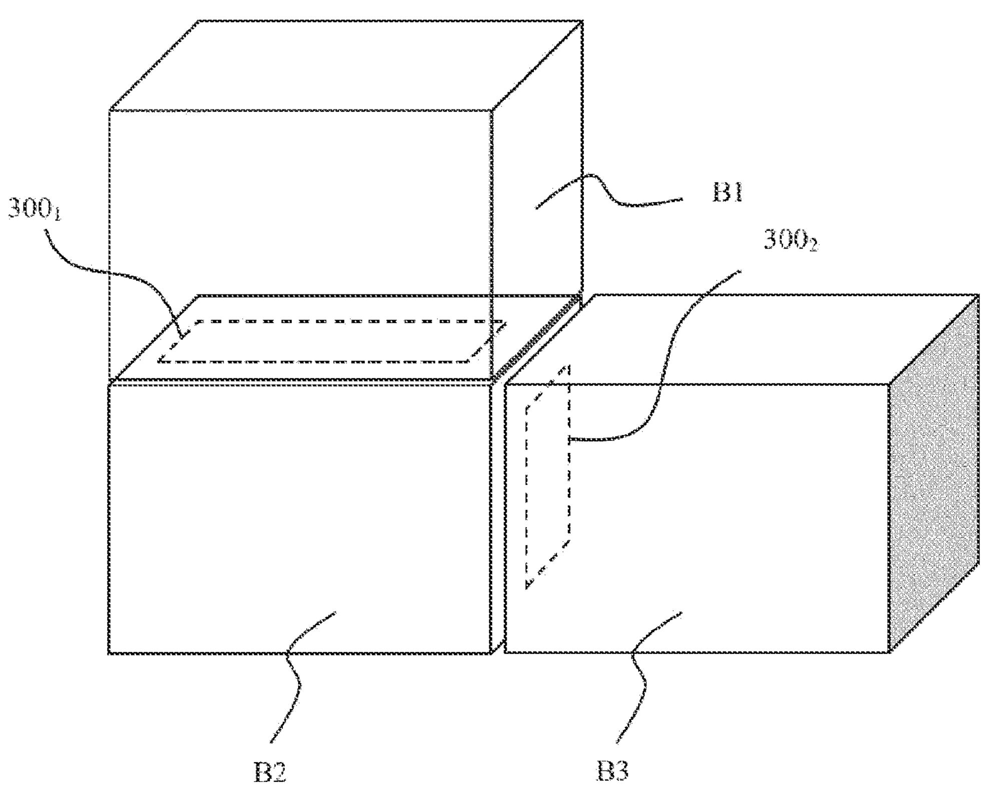
[Fig 13]
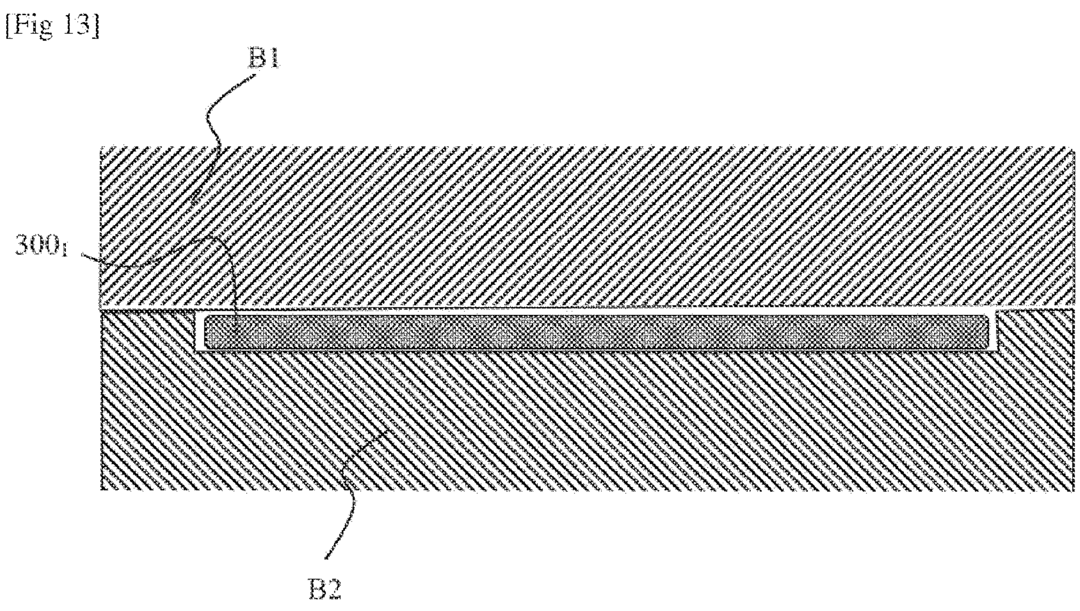

INSTRUMENTED PLATE FOR OVEN

RELATED APPLICATION

This application is a National Phase of PCT/EP2022/065578 filed on Jun. 8, 2022, which claims the benefit of priority from French Patent Application No. 21 06067 filed on Jun. 9, 2021, the entirety of which are incorporated by reference.

TECHNICAL FIELD

The invention relates to an instrumented plate intended for the monitoring of a refractory part of a furnace, in particular a metallurgical or glass furnace, notably for determining an appropriate time to repair or stop the furnace.

The invention also relates to a furnace comprising a refractory part subjected to high temperatures and such an instrumented plate disposed to monitor said refractory part, in particular evaluate the thickness, the mean temperature, or a state of damage of said refractory part.

PRIOR ART

In general, "furnace" refers to an installation or a reactor comprising a chamber and a heating system designed to establish a temperature of above 800° C. in said chamber.

A furnace is in particular used for the fabrication of fused products, for example for the fabrication of metallurgical or glass products, but also for the incineration of waste or the generation of energy from fuels. For example, a reaction gas turbine is considered to be a furnace.

A furnace can consume gas or other fuels, or be provided with electrical resistances, or be heated by induction.

A metallurgical furnace may be an installation in which a metal precursor is reduced in order to obtain cast iron. A metallurgical furnace may also be a metal smelting furnace or a remelting furnace. For example, a furnace may be a blast furnace for smelting cast iron from iron ore or for remelting copper cathodes smelted by another process, for example for producing copper wire.

A glass furnace can be an installation in which a vitrifiable mixture, in particular comprising oxides, carbonates, sulfates and nitrates, is melted and refined.

The walls of the chamber of a furnace are conventionally protected with a refractory lining. The refractory lining undergoes different chemical and mechanical stresses depending on the application. Its composition is adapted as a result. For example, the interior of a glass furnace is conventionally subjected to a temperature of approximately 1500° C. The refractory lining in contact with the molten glass should moreover resist abrasion by the molten glass.

The composition of the refractory lining is in particular adapted to the targeted application.

For example, the refractory lining in contact with the molten glass or with its vapors is conventionally made of a refractory product of the alumina-zirconia-silica (AZS for short) type generally containing from 30% to 45% by weight of zirconia, a product with a very high zirconia content (typically more than 85% by weight of zirconia), a product with a high alumina content (typically more than 90% by weight of alumina), or a zircon product, or a chromium oxide product.

In a copper cathode melting furnace, the refractory lining is generally based on SiC.

In a blast furnace for cast iron, refractory linings made of SiC, corundum, SiAlON, carbon or mullite are conventionally used, depending on the area in question of the furnace.

In order to optimize the service life of the refractory lining, measurements can be taken on the inside or outside of the furnace. These measurements make it possible to plan repair operations, notably hot-repair operations, or refractory lining replacement operations with greater precision.

For example, temperatures can be read off by infrared thermography, but this is possible only at locations that are visually accessible by an infrared camera, this excluding notably certain parts of the lining of the furnace. Furthermore, this solution generally does not allow continuous monitoring.

Measuring devices permitting continuous monitoring in a nonintrusive way, that is to say without entering the chamber of the furnace, are known. Notably, WO2020025492A1 describes, to measure the wear of a refractory lining for a glass furnace, the use of a network of optical fibers sandwiched between the cold face of the blocks of the side wall of the tank of the furnace and a thermally insulating layer, or through said insulating layer. Moreover, EP1527306A1 describes, to measure the temperature in a metallurgical induction furnace, the use of an optical fiber disposed within a fibrous mat between a dense refractory lining and an inductor insulator.

The solutions of the prior art allowing continuous monitoring do, however, pose problems

- in terms of reliability, and in particular resistance to high temperatures, notably when the sensors comprise polymer parts,
- in terms of disruption of the operation of the furnace, in particular disruption of the heat exchanges through the cold face of the refractory lining,
- in terms of thermomechanical stresses resulting from the attachment of the sensors to the refractory lining, and
- in terms of installation and maintenance, notably in the event of failure of the sensor.

There is therefore a permanent need for a solution which is easy to implement (installation, maintenance) and makes it possible to monitor the refractory lining of a furnace continuously and reliably, without considerably modifying the behavior of the furnace, and in particular without modifying the thermomechanical stresses exerted on the refractory lining or disrupting the transfers of heat through the refractory lining.

An aim of the invention is to meet this need, at least partially.

SUMMARY OF THE INVENTION

The invention relates to an instrumented plate intended for the monitoring of a refractory part of a furnace, and in particular a refractory part having a hot face subjected to a temperature above 800° C., or even above 1000° C., above 1200° C., above 1400° C. or above 1500° C., the instrumented plate comprising:

- a support plate, preferably through which a plurality of orifices pass, which is at least partially made of a material consisting of fibers interconnected by a ceramic matrix, referred to as "ceramic-matrix composite", or consisting of a precursor of said ceramic-matrix composite, preferably consisting of a ceramic-matrix composite or a precursor of said ceramic-matrix composite;

a sensor borne by said support plate.

As will be seen in more detail in the rest of the description, the inventors have discovered that a plate made of a ceramic-matrix composite constitutes a sensor support that is particularly well suited to the targeted applications. A ceramic-matrix composite has good resistance to high temperatures and effectively protects the sensor, notably from mechanical impacts. It is easy to manipulate and install.

Furthermore, the inventors have discovered that the presence of orifices limits interactions with the refractory part. In particular, the presence of the instrumented plate on the refractory part does not substantially provide any additional mechanical stresses or thermal insulation. The furnace therefore does not have to be modified because of the installation of the instrumented plate, notably when the face of the refractory part on which the instrumented plate is immobilized is cooled, for example by blowing air.

Moreover, the inventors have discovered that the presence of orifices significantly reduces the transmission of mechanical stresses to the sensor. The reliability is therefore improved.

Lastly, the instrumented plate can be shaped to fit this face of the refractory part, thereby improving the accuracy of the measurements taken.

The instrumented plate may also comprise, notably, one or more of the following optional and preferred features:

at least one orifice, preferably each orifice, has an equivalent diameter greater than 3 mm and/or less than 50 mm;

the percentage of perforation, equal to the ratio of the cumulative surface area of the orifices, or "perforated surface area", to the surface area of the support plate, said surface area including the perforated surface area, is greater than 5%, preferably greater than 50%, and/or less than 95%;

the sensor is a sensor for measuring an optical, electrical or acoustic signal, preferably selected from a thermocouple, a piezoelectric sensor, a stress gauge, an optical fiber, an ultrasonic wave propagation fiber, and an acoustic sensor;

the support plate has a thickness of between 1 and 20 mm;

the identical or different, preferably identical, orifices are evenly distributed in at least one "perforated" zone of the support plate;

the support plate has several of said perforated zones and at least one reinforcing zone, or "non-perforated zone", separating two of said perforated zones, the reinforcing zone having a width greater than the largest dimension of said orifices;

the ceramic-matrix composite or the ceramic-matrix composite precursor comprises a plurality of superposed textiles, one or more identical or different sensors, for example a temperature sensor and a deformation sensor, being preferably sandwiched between two of said textiles;

the sensor is embedded within the ceramic-matrix composite or the precursor of said ceramic-matrix composite, preferably sandwiched between two textiles, or integrated in the arrangement of fibers of the ceramic-matrix composite or of the precursor of said ceramic-matrix composite, for example like a weft yarn, warp yarn or knit, or accommodated in a recess formed or inserted in the ceramic-matrix composite or the precursor of said ceramic-matrix composite, preferably in a recess formed on a large face of the support plate, for example in a pocket, a sheath, a tube open at its two ends, an envelope open at one of its ends or a shell, or attached to a large face of the support plate, preferably by means of a refractory adhesive, tape, clip or wire;

the fibers represent more than 25% and less than 70% of the volume of the ceramic-matrix composite;

the ceramic-matrix composite comprises, in percentage by mass, more than 80%, more than 90%, more than 95%, or even substantially 100% of one or more of the following oxides or non-oxides: $Al_2O_3$, $ZrO_2$, $HfO_2$, $Cr_2O_3$, MgO, CaO, $SiO_2$, SiC, $Si_3N_4$, SiAlON, AlN, $Si_2ON_2$, BN, $B_4C$, silicon oxycarbide, $MoSi_2$, and carbon C;

the ceramic-matrix composite has a resistance to compressive crushing of greater than 10 MPa, and/or a thermal conductivity between 20° C. and 500° C. of greater than 2.0 $W \cdot m^{-1} \cdot K^{-1}$.

The invention also relates to a measuring device comprising an instrumented plate according to the invention and a measuring appliance communicating with the sensor so as to receive and interpret a signal emitted by the sensor.

Preferably, the measuring device uses the signal it receives from the sensor to provide information relating to:

the thickness of the refractory part, in particular when the instrumented plate is attached to the cold face of a block and when the hot face of the refractory part is in contact with a molten material, for example glass or a metal, or the mean temperature of the refractory part, or the physical state of the refractory part, for example the presence of a phase transformation of or damage to the refractory part, for example flaking, an internal crack, a phase modification linked to infiltration, or oxidation in the case of a refractory part made of a non-oxide material.

Those skilled in the art know to select sensors that are suitable for the desired information.

The invention also relates to a furnace comprising a measuring device according to the invention.

The furnace may also comprise, notably, one or more of the following optional and preferred features:

the furnace is selected from a glass melting furnace, a metallurgical furnace, an incinerator, a gasifier, a combustion chamber intended for energy generation, and a gas reforming installation intended for the chemical industry;

the furnace contains a molten material, in particular a molten glass or metal, or a gaseous environment at a temperature above 800° C.;

the furnace comprises a refractory part and the instrumented plate is disposed in contact with a face of the refractory part, preferably so as to fit said face;

the refractory part is a side wall or a floor of a tank of the furnace or a block of said side wall or said floor;

the refractory part has a face intended to be at a temperature above 800° C., referred to as "hot face", and a face facing away from said hot face, referred to as "cold face", and the instrumented plate is disposed in contact with said cold face, the hot face preferably being in contact with the interior of the furnace;

the refractory part is a first refractory block adjacent to a second refractory block, and the instrumented plate is disposed between said first and second refractory blocks, preferably pinched, or "compressed", between said first and second refractory blocks;

- the first refractory block is denser than the second refractory block, which may be in particular an insulating block;
- the instrumented plate extends against a vertical or horizontal face of the refractory part, notably, for example, if the refractory part is a throat block or a tank block, respectively;
- the surface area of the instrumented plate, which includes the surface area of the orifices, represents more than 20% of the surface area of the face of the refractory part against which it is applied;
- the coefficient of thermal expansion of the ceramic-matrix composite of the instrumented plate is equal to that of the material of the refractory part plus or minus 20%;
- the instrumented plate is attached to the refractory part so as to not exert thermomechanical stresses on the refractory part under the effect of a dimensional modification of the refractory part resulting from nominal operation of the furnace.

BRIEF DESCRIPTION OF THE FIGURES

Other features and advantages of the invention will become more clearly apparent from reading the following detailed description and from examining the appended drawing, in which:

FIG. 1 schematically shows a half-section of an example of a glass furnace;

FIG. 2 schematically shows a half-section of an example of a metallurgical induction furnace;

FIG. 3 schematically shows a front view of a first example of an instrumented plate according to the invention;

FIG. 4 schematically shows a front view of a second example of an instrumented plate according to the invention;

FIG. 5 schematically shows a front view of a third example of an instrumented plate according to the invention;

FIG. 6 schematically shows a front view of a fourth example of an instrumented plate according to the invention, in the use position;

FIG. 7 schematically shows a front view of a fifth example of an instrumented plate according to the invention;

FIG. 8 schematically shows a cross section of a sixth example of an instrumented plate according to the invention;

FIG. 9 schematically shows a cross section of another example of an instrumented plate according to the invention;

FIG. 10 schematically shows a cross section of yet another example of an instrumented plate according to the invention;

FIG. 11 illustrates the bending deformability of an instrumented plate in a preferred embodiment of the invention;

FIG. 12 illustrates a positioning of an instrumented plate according to the invention between refractory blocks of a furnace;

FIG. 13 shows a vertical section of an embodiment in which there are two superposed blocks between which an instrumented plate is inserted. Identical references are used to denote identical or similar members.

DEFINITIONS

A "refractory part" is understood to mean an element of the furnace made of a refractory material. A refractory part may be a block, but also an assembly of blocks, for example a side wall of a tank, or a floor, notably formed by casting. A refractory part is conventionally made of a fused material or a sintered material. Conventionally, an insulating layer covers the cold face of the refractory part in order to limit exchanges of heat. The insulating layer may be absent, for example in a part of the refractory lining of an incineration furnace or in a blast furnace.

Conventionally, when the refractory part has a hot face, its "thickness" is its dimension measured in a direction perpendicular to its hot face. For example, for a tank side block in contact with molten glass or metal, the thickness is measured in a substantially horizontal direction toward the bath of molten glass or metal. For a floor, the thickness is measured in a vertical direction.

The "hot face" is that face of a refractory part that is exposed to a space of the furnace which is at above 800° C., for example containing molten glass or metal or intended to contain molten glass or metal. The hot face may be in contact, or intended to be in contact, with molten glass or metal and/or with the gaseous environment that extends above the molten glass or metal. The hot face is thus that face of the refractory part that is subjected or is intended to be subjected to the highest temperatures. All of the hot faces of the blocks of the side wall of the glass or metal melting tank may together also, by extension, be described as a "hot face". The upper surface of the floor may also be described as a "hot face."

The adjective "hot" is used for the sake of clarity. Before the furnace is in service, the "hot" face is the face which is intended to be subjected to the highest temperatures after being put into service.

A "cold face" is a surface area of the refractory part that is not exposed to a space of the furnace which is heated to above 800° C., that is to say which is insulated from this space by the material of the refractory part. The cold face opposite the hot face is the face which is furthest from said space. Conventionally, the cold face opposite the hot face is the face which, in service, is subjected or which is intended to be subjected to the lowest temperatures. The cold face may be parallel to the hot face.

The "use position" is the configuration in which the instrumented plate rests on a face, for example the cold face, of the refractory part so as to acquire a measurement relating to said refractory part.

The term "plate" conventionally denotes a component having two large faces that are substantially parallel to one another and having a small thickness with respect to the surface area of a said large face, the thickness direction of the plate being perpendicular to said large faces. The "maximum thickness/surface area of the large face" ratio is preferably less than $1/500\ m^{-1}$, preferably less than $1/1000\ m^{-1}$, preferably less than $1/5000\ m^{-1}$, and preferably less than $1/10000\ m^{-1}$.

The "surface area" of a plate is the area inside the perimeter of the plate. The surface area of the plate therefore includes the surface area defined by the material of the plate and the surface area of the orifices passing through the plate.

The thickness of the instrumented plate is its dimension measured perpendicularly to the large face of the instrumented plate intended to be positioned or positioned against the refractory part.

An orifice passing through a plate is an orifice which has first and second openings leading into the first and second large faces of the plate. An orifice is preferably rectilinear and preferably extends perpendicularly to the large faces of the plate. The "surface area" of an orifice is the surface area of its opening on the side of the refractory part against which the plate is intended to be placed. The length of an orifice is the largest dimension of this opening. Its width is the largest dimension of this opening perpendicularly to the direction of its length.

A "perforated surface area" is understood to mean the cumulative surface area of all of the surface areas of the orifices.

The percentage of perforation of a perforated zone (or of the instrumented plate) is the ratio of the perforated surface area of said perforated zone (or of said instrumented plate, respectively) to the surface area of said perforated zone (or of said instrumented plate, respectively) which includes said perforated surface area.

The "equivalent diameter" of an orifice is the diameter of a disk having the same surface area as this orifice.

A "fused product", often referred to as "electrofused", is understood to mean a product obtained by complete solidification of a composition in the liquid state obtained by melting a mixture of appropriate raw materials in an electric arc furnace or by any other suitable technique.

A "sintered product" is understood to mean a product obtained by mixing appropriate raw materials, and then shaping this mixture in the green state and firing the resulting green form at a temperature and for a time that are sufficient to sinter this green form, it being possible to perform said firing in situ during use.

A "ceramic-matrix composite", or "CMC", is conventionally understood to mean a product composed of fibers interlinked by a ceramic matrix. The fibers will be selected depending on the environment in which the ceramic-matrix composite is to be placed, notably depending on the conditions regarding temperature, corrosion, thermal cycling, expansion, and according to the nature of the refractory part that is to be furnished.

The arrangement of the fibers, which constitutes the fibrous support for the matrix, is selected depending on the desired shape for the ceramic-matrix composite, and on the ease with which the sensor can be attached to it. For example, a stack of woven fabrics or insulating mats is well suited to simple plates, a filament winding is well suited to plates having a geometry that exhibits symmetry of revolution, and filament placement is well suited for complex shapes of large dimensions.

A "ceramic-matrix composite precursor" is a material which is capable of transforming into said ceramic-matrix composite under the effect of heating, preferably to above 600° C., preferably to above 700° C., preferably under the effect of sintering.

The fibers are conventionally in the form of a textile. The CMC may then be described as "ceramic-matrix textile".

A textile may be:

- an organized two-dimensional structure of fibers or yarns, notably a knit, a braid, a woven fabric, or
- a random two-dimensional structure of fibers or yarns, this random structure not being preferred.

A textile is distinguished in particular from a fibrous mat, in which the organization of the fibers or yarns is random in the three spatial dimensions.

A "fiber" is a filament of which the length is greater than 5 times its equivalent diameter. The "diameter" of a fiber is the diameter of a disk having the same surface area as its cross section halfway along.

A "yarn" is an assembly of fibers which, in cross section, comprises more than 10 and preferably less than 500 000 fibers, and of which the length is greater than 5 times the diameter.

A "ceramic" is understood to mean a product which is neither metallic nor organic. Within the scope of the present invention, carbon is considered to be a ceramic product.

A "skin" is conventionally understood to mean the peripheral region of a fused block, made from the molten material that was less than 5 millimeters (mm) from the wall of the mold as it solidified.

"Machining" is understood to mean a correction operation which is used to machine the surface of a refractory part in order to obtain a precise surface geometry.

For the sake of clarity, the chemical formulae of the oxides are used to denote the amounts of these oxides in a composition. For example, "$ZrO_2$", "$SiO_2$" or "$Al_2O_3$" denote the amounts of these oxides and "zirconia", "silica" and "alumina" are used to denote phases of these oxides made up of $ZrO_2$, $SiO_2$ and $Al_2O_3$, respectively.

Unless stated otherwise, all oxide contents are percentages by mass based on the oxides. A content by mass of an oxide of a metallic element refers to the total content of this element expressed in the form of the most stable oxide, in accordance with the standard industry convention.

A transverse plane of an object is a plane perpendicular to the direction of the length of said object.

"Horizontal" and "vertical" are understood to mean an orientation forming an angle of less than 5°, or even less than 2°, or even less than 1°, with a perfectly horizontal and vertical plane, respectively.

"Include" or "comprise" or "have" should be interpreted in a nonlimiting manner.

DETAILED DESCRIPTION

Furnace—Refractory Part

A furnace according to the invention can be any conventional furnace, in particular selected from glass furnaces, metallurgical furnaces, waste incineration plant furnaces, gasifiers, energy generation furnaces, in particular gas turbines, and gas reforming installations intended for the chemical industry.

The invention preferably relates to a glass furnace. However, the invention is not limited to this preferred application.

FIG. 1 schematically shows a half-cross section of a glass furnace 10. A tank 12, a metallic structure 14 and a superstructure 16 can in particular be distinguished.

The tank 12, intended to contain the molten glass, has a vertical side wall 22 and a floor 24. The side wall 22 is conventionally made up of side tank blocks which extend over the entire height of the tank as far as an upper edge 25.

A thermally insulating layer, not shown in FIG. 1, is disposed conventionally against the cold face of the side wall. In particular, the insulating layer may encircle the side wall of the glass melting tank of the furnace.

The superstructure 16 conventionally comprises, at its base, an intermediate layer 18 via which it rests on the metallic structure, a side wall 26 resting on the intermediate layer 18, and a crown 28. Burners, which are not shown, are disposed in the side wall 26 and operate alternately.

The metallic structure 14, conventionally made of cast iron, surrounds the side wall 22 of the tank on the outside. It supports the weight of the superstructure 16.

The intermediate layer 18 comprises, and preferably is made up of, tuckstones 20.

The chamber of the furnace is thus defined by various parts subjected to different chemical and mechanical stresses. The invention is particularly useful for monitoring a refractory part in contact with molten glass, and in particular monitoring the state of the side wall of the tank and the floor.

The refractory part may be in particular the crown, the side wall of the superstructure, the intermediate layer, the side wall of the tank, the floor, a block of the crown, of the side wall of the superstructure, of the intermediate layer, of the side wall of the tank, or of the floor.

The invention also relates to a metallurgical furnace. In particular, FIG. 2 schematically shows a cross section of a crucible of an induction furnace, for example for remelting metals and/or treating them, for example dephosphorization. This crucible comprises a side wall 110 which extends, substantially vertically, from a base 112.

The side wall 110 of the crucible conventionally comprises, from the outside to the inside of the crucible:

- a support layer 114, to which the inductor 116 is attached;
- at least one thermally insulating layer 118;
- at least one electrically insulating layer 120;
- a refractory lining 122 defining the internal surface 128 of the crucible.

The base 112 conventionally comprises, from the outside to the inside of the crucible:

- a substantially horizontal floor 130;
- a refractory lining 122' defining the internal surface 128 of the crucible.

During operation, the temperature can conventionally exceed 800° C., or even 1000° C. or 1200° C., or even 1300° C. or 1400° C., depending on the metal in question. The temperature is generally below 1700° C.

The refractory part may be in particular the support layer 114, the thermally insulating layer 118, the electrically insulating layer 120, the refractory lining 122 directly in contact with metal, the floor 130, the refractory lining 122', or one or more blocks of this thermally insulating layer 118, this electrically insulating layer 120, this refractory coating 122, this floor 130 and this refractory coating 122'.

The refractory part may be a part of the furnace which is not in contact with the interior of the chamber of the furnace.

The refractory part may be in particular a throat lintel or block, a soldier block, a refractory brick or sidewall block, a corner block, a tuckstone, a paving tile or pavement, a crown brick or beam, a tuyere surround block or brick or a brick for a tapping hole or spout, an electrode block, an injector block, a refractory spout-lip for a glass furnace, a block for an injector, a glass furnace throat, a component for a heat exchanger of a furnace, in particular an exchanger tube, a refractory tile or plate, in particular a boiler lining tile or tube, a shell for protecting a heater tube for an incinerator, an incinerator tile, a ceramic component for a solar absorber, a protective component or tile for a turbine combustion chamber, in particular a gas turbine chamber, a block or surround for a tuyere or a burner.

Preferably, the refractory part is stiff, like a block or an assembly of blocks, preferably consolidated, and in particular sintered or fused.

The invention is particularly well suited for a refractory part having a hot face in contact with the interior of the furnace, preferably in contact with a molten material, and a cold face opposite the hot face. The instrumented plate makes it possible in particular to detect abnormal or excessive infiltration of molten material into the refractory part, such infiltration not always being detectable using conventional furnace supervision tools.

The refractory part may be made of a fused product, that is to say a product obtained by melting a refractory mixture to a temperature above 1000° C., preferably above 1500° C., or even above 1800° C.

The refractory part may be made of a sintered product, that is to say a product obtained from a refractory mixture shaped and sintered, preferably at a temperature above 600° C., preferably above 1000° C.

The chemical composition of the refractory part may be a known composition for conventional linings, in the targeted application.

The refractory part is preferably formed of a refractory block or an assembly of multiple refractory blocks.

Preferably, the said refractory block or blocks are prefabricated, that is to say obtained from a refractory mixture, for example a refractory concrete or ramming mix, shaped and then subjected to baking, at a temperature preferably below 600° C.

More than 95%, preferably more than 97%, preferably more than 99%, preferably more than 99.5%, preferably more than 99.9%, of the mass of the refractory part is preferably made up of refractory oxides and/or non-oxides.

In one embodiment, the refractory part has a chemical composition, in percentage by mass based on the oxides, such that $Al_2O_3+ZrO_2+SiO_2+Cr_2O_3>80.0\%$.

In one embodiment, the refractory part, which is preferably fused, has a chemical composition comprising, in percentage by mass based on the oxides, more than 0.5%, or even more than 1.5%, or even more than 3.0%, or even more than 4.0%, or even more than 5.0%, or even more than 6.0%, and/or less than 10.0%, or even less than 9.0%, or even less than 8.0% of a zirconia stabilizer, in particular CaO and/or $Y_2O_3$ and/or MgO and/or $CeO_2$, preferably $Y_2O_3$ and/or CaO, preferably $Y_2O_3$.

In one embodiment, the refractory part is a fused product and may also comprise one or more of the following optional features:

- at least some, preferably all, of the surfaces of the refractory part that are intended to be exposed to the environment inside the furnace have a skin microstructure. In particular, preferably at least some, preferably all, of the surface of the tank and/or the transition surface has a skin microstructure;
- the surface with a skin microstructure has a crystals density less than 30 times, or even less than 25 times, or even less than 20 times the crystals density measured at a depth of 4 cm beneath said surface.

Obtaining a skin microstructure on the surface of a fused component, that is to say a component made of a fused product, does not pose any particular difficulty to those skilled in the art. In particular, those skilled in the art will know that a microstructure can be made finer on the surface by increasing the solidification rate of the molten material.

When the bath of molten material is poured into the mold, the properties of the mold and the temperature of the mold can notably be adapted to ensure cooling which is fast enough to obtain a skin microstructure. For example, if the mold is initially at ambient temperature, it forms a skin microstructure on the surface in contact with or close to the walls of the mold. If, in contrast to established practice, this skin is not removed during a machining operation, what is thus obtained is a skin microstructure on the surfaces of the refractory part that have not been machined.

Limited machining (planing) makes it possible, however, to preserve a skin microstructure.

Of course, the composition, the dimensions, the shapes and the microstructures described above are not limiting.

The fact that the instrumented plate closely follows the shape of the refractory part advantageously contributes to the optimum performance of the sensor.

Instrumented Plate

The instrumented plate is an “instrument”, in the form of a fine component or a layer, which is intended to take measurements.

FIGS. 3 to 8 show examples of an instrumented plate 300.

The instrumented plate may be disposed against any face but is particularly useful for at least partially covering a face at a temperature above 150° C., above 300° C., above 400° C., and/or below 800° C.

As illustrated in FIG. 6, in the use position, the instrumented plate 300 extends against a face of the refractory part P, in the present case the cold face F.

That portion of the face of the refractory part that is in contact with the instrumented plate 300 can be flat, for example defined for a throat ceiling of a glass furnace or a tile for a gas turbine. It may be flat, straight or curved, for example be the face of a tuckstone in the particular case of a glass furnace. Preferably, it is flat.

FIG. 6 illustrates an embodiment in which the cold face F of the refractory part, opposite the hot face C, takes the overall shape of a corner profile formed by two facets which may in particular extend perpendicularly to one another.

Preferably, the instrumented plate 300 has, between the large faces $G_1$ and $G_2$, a preferably constant mean thickness e (see FIG. 8) less than 40 mm, preferably less than 32 mm, preferably less than 28 mm, preferably less than 22 mm, preferably less than 20 mm, preferably less than 10 mm, or even less than 18 mm or 15 mm, and/or preferably greater than 1 mm, preferably greater than 2 mm, or even greater than 3 mm, or greater than 5 mm. A thickness of between 1 and 20 mm, preferably between 2 and 10 mm, is preferred, notably in order to be able to easily insert it between the refractory part and the insulating rear part or the external envelope of the furnace while still allowing sufficient mechanical strength of the instrumented plate 300.

The surface area of the instrumented plate 300 is preferably greater than 100 cm$^2$, preferably greater than 200 cm$^2$, preferably greater than 300 cm$^2$, preferably greater than 400 cm$^2$, and/or less than 20 000 cm$^2$, preferably less than 15 000 cm$^2$ or even less than 10 000 cm$^2$.

Preferably, the instrumented plate 300 extends over more than 20%, or even more than 30%, more than 40%, more than 50%, more than 60%, more than 70%, more than 80%, more than 90%, or even 100% of the surface area of the face of the refractory part that receives it, in particular the cold face of the refractory part.

Preferably, the instrumented plate 300 is prefabricated, that is to say fabricated before being applied against the refractory part.

The instrumented part 300 preferably has sufficient stiffness to be self-supporting, that is to say keep its shape when it is handled at ambient temperature (20° C.). In the use position, the sensor is thus effectively held in position.

Preferably, the instrumented plate 300 has a complementary shape to that of the face against which it is intended to be disposed or against which it is disposed.

For example, it may be disposed, or even attached, in a receiving portion formed on this face, for example in the embodiment in which it is disposed between two adjacent blocks, as illustrated in FIGS. 12 and 13.

In particular, the instrumented plate 300 may take the form of a flat plate with multiple flat facets, or have a cylindrical shape.

The stiffness of the instrumented plate 300 preferably allows it to be bent by hand, as shown in FIG. 11. Advantageously, it can thus better fit the shape of the face of the refractory part that receives it.

In one embodiment, the instrumented plate 300 takes the form of a roll before being affixed to the refractory part.

According to the invention, the instrumented plate 300 has a perforated zone 302, that is to say a zone through which a plurality of orifices 304 pass.

The perforation greatly limits the influence of the instrumented plate on the operation of the refractory part, and in particular the impact of the instrumented plate on the transfer of heat. The perforation also reduces the thermomechanical stresses exerted on the refractory part by the instrumented plate.

The percentage of perforation of a perforated zone, preferably of any perforated zone, preferably of the instrumented plate, is preferably greater than 5%, preferably greater than 10%, preferably greater than 15%, or even greater than 20%, greater than 30%, greater than 40%, greater than 50%, and/or less than 95%, preferably less than 90%.

FIG. 5 provides an example of an instrumented plate with a very high percentage of perforation, the instrumented plate taking the general form of a grid.

The shape and the distribution of the orifices 304 may take various configurations depending on the dimensions of the refractory part.

In a perforated zone, preferably in each perforated zone 302, the orifices 304 are preferably evenly distributed.

In a perforated zone 302, preferably in each perforated zone, the orifices may have identical or different, preferably identical, shapes and/or dimensions.

The orifices 304 preferably have a shape which is oval, round, as illustrated in FIG. 6, or polygonal, preferably rectangular, square or rhomboid, as illustrated in FIGS. 3 and 4.

Preferably, at least one orifice 304, preferably each orifice of a perforated zone 302, preferably of each perforated zone, has an equivalent diameter and/or a length and/or a width greater than 2 mm, greater than 3 mm, and/or less than 300 mm, preferably less than 200 mm, preferably less than 150 mm, preferably less than 100 mm, preferably less than 50 mm.

Preferably, to minimize the impact on the transfer of heat, the surface area of each orifice 304 is between 4 mm$^2$ and 1000 cm$^2$.

The cross section of an orifice 304, in a sectional plane perpendicular to the thickness direction of the instrumented plate, can be constant or variable in the sectional plane in question. A variation in cross section advantageously makes it possible to locally define the mechanical resistance properties, for example the way in which the instrumented plate deforms.

In a perforated zone 302, preferably in each perforated zone, the orifices 304 are preferably evenly distributed. Preferably, each orifice is separated from all adjacent orifices by a distance greater than 0.5 mm, preferably greater than 1 mm, preferably greater than 2 mm, and/or less than 50 mm, preferably less than 40 mm, preferably less than 30 mm, preferably less than 20 mm, preferably less than 15 mm, preferably less than 10 mm, preferably less than 5 mm.

A perforated zone 302, preferably each perforated zone, preferably has the overall form of a grid, a mesh or a lattice.

In one embodiment, the instrumented plate 300 has multiple perforated zones 302, preferably evenly distributed over the instrumented plate, which are separated by zones without orifices, referred to as “reinforcing zones” 306, as illustrated in FIG. 4. In one embodiment, all of the reinforcing zones form a regular pattern, for example a frame or a grid pattern.

The reinforcing zones advantageously contribute to the mechanical strength of the instrumented plate.

The width l of a reinforcing zone, that is to say the smallest distance between the two perforated zones that it separates, preferably the width of any reinforcing zone, is preferably

- greater than 5 mm, preferably greater than 10 mm, preferably greater than 15 mm and/or preferably less than 200 mm, preferably less than 150 mm, preferably less than 100 mm, or even less than 80 mm, and/or
- more than, preferably more than twice, preferably more than 3 times, and/or preferably less than 20 times the largest dimension of the orifices of the perforated zones that it separates.

Preferably, the thickness of the reinforcing zones 306 is identical to that of the perforated zones.

The instrumented plate 300 can be kept in contact with the refractory part by any known means of the prior art.

The face of the refractory part that receives the instrumented plate may be grooved or machined so as to form a recess or a receiving portion for attaching the instrumented plate, for example by clipping or pinching.

Generally, the instrumented plate is preferably immobilized on the refractory part, so as to not exert thermomechanical stresses on the refractory part under the effect of a dimensional modification of the refractory part during normal or "nominal" operation of the furnace.

Preferably, the instrumented plate is not attached over its entire surface area but by way of attachment points and/or attachment lines.

In one embodiment, the instrumented plate 300 is interposed between two facing faces of two adjacent refractory blocks, in particular vertical or horizontal faces. It is preferably compressed between these faces, such that it is not necessary to attach it to said faces.

In one embodiment, the instrumented plate 300 is immobilized on the face that receives it by complementarity of shapes with said face.

The instrumented plate 300 may also be adhesively bonded to the refractory part. Preferably, the adhesive used to attach the instrumented plate is selected from mixtures of ceramic powders and binders, preferably applied in liquid form.

Preferably, the powders are alumina and/or silica and/or mullite powders. Preferably, the binders are selected from colloidal silica, sodium silicate, organic resins, organic adhesives, and mixtures of these. The adhesive used may also be a commercial adhesive such as the Fixwool adhesive FX from Unifrax.

The instrumented plate 300 comprises a support plate 310 and one or more sensors 312 borne by the support plate 310, preferably integrated in the support plate 310, as illustrated in FIGS. 8 to 10 for example.

In one embodiment, the support plate 310, or even the instrumented plate 300, is fabricated, in particular sintered, in situ, that is to say on the refractory part. The instrumented plate 300 can then be considered to be a "layer" covering the face of the refractory part that receives it, that is to say against which it extends.

CMC

The support layer 310 comprises, preferably is made up of, a ceramic-matrix composite, or "CMC", or a CMC precursor.

Those skilled in the art will know how to adapt a CMC precursor depending on the desired CMC. Therefore, only the CMC is described in detail below.

The support plate 310 defines the overall shape of the instrumented plate and serves as support for one or more sensors.

A CMC has proven to be particularly resistant to thermal degradation. A CMC also has good resistance to corrosion by soda-containing vapors.

Preferably, the CMC is sintered, conventionally under air, at atmospheric pressure.

Preferably, the CMC has an open porosity, measured by imbibition, according to Archimedes' principle of buoyancy, of greater than 25%, preferably greater than 30% and less than 45%, preferably less than 35%.

The CMC preferably has an apparent density greater than 1.4 g/cm$^3$, or even greater than 1.50 g/cm$^3$ and/or less than 2 g/cm$^3$, preferably less than 1.9 g/cm$^3$, preferably less than 1.80 g/cm$^3$.

In particular when the instrumented plate is attached to the cold face of the refractory part, for example by adhesive bonding or mechanical attachment, for example by insertion into a groove, it is preferable if the coefficient of thermal expansion (also referred to as thermal expansion coefficient) of the CMC differs from that of the material of the refractory part by no more than 20%. The coefficient of thermal expansion of the CMC can be set by techniques well known to those skilled in the art, notably by adapting the composition of the CMC. For example, the coefficient of thermal expansion of silica between 20° C. and 1000° C. is $0.5\times10^{-6}$ $m\cdot K^{-1}$, $8.0\cdot10^{-6}$ $m\cdot K^{-1}$ for alumina, $4.5\cdot10^{-6}$ $m\cdot K^{-1}$ for SiC, and less than $1.0\cdot10^{-6}$ $m\cdot K^{-1}$ for carbon.

In one embodiment, the absolute value of the difference between the thermal conductivity of the CMC and the thermal conductivity of the refractory part is less than 10% of the thermal conductivity of the CMC, preferably less than 2.0 $W\cdot^{-1}\cdot K^{-1}$, between 20° C. and 500° C.

In one embodiment, the CMC has, between 20° C. and 500° C., a thermal conductivity greater than 2.0 $W\cdot m^{-1}\cdot K^{-1}$, preferably greater than 5.0 $W\cdot m^{-1}\cdot K^{-1}$, or even greater than 10 $W\cdot m^{-1}\cdot K^{-1}$, or even greater than 50 $W\cdot m^{-1}\cdot K^{-1}$.

Simple texts make it possible, in order to obtain a given coefficient of thermal expansion and/or a given thermal conductivity, to assay the amounts of fibers of silica, alumina, SiC and carbon and/or the amount of matrix of silica, alumina, SiC and carbon. For example, the thermal conductivity of the CMC can be adapted by combining fibers, for example thermally conductive fibers of graphite or SiC, with a rather insulating matrix, for example of alumina, or by combining a thermally conductive matrix, for example of SiC, with rather insulating fibers, such as fibers of alumina or silica.

Preferably, the CMC has a 3-point flexural strength, measured in accordance with the standard ASTM C1341-13, greater than 3 MPa, preferably greater than 6 MPa, preferably greater than 10 MPa. Advantageously, this in turn improves the mechanical strength, notably its resistance to impacts.

Also preferably, the CMC, in particular in the form of a ceramic-matrix textile, has a very high resistance to compressive crushing, for example measured as described below, of greater than 5 MPa, preferably greater than 10 MPa, thereby improving the stability of the sensor. This resistance to compressive crushing is notably greater than that of the layers made up of insulating mats.

To measure the resistance to compressive crushing of a layer of thickness e, a sample of dimensions equal to 50×50×10 mm$^3$, the dimension of 10 mm being in the direction of the thickness e, is extracted from it. A load is then applied, at ambient temperature, over all of the surface area 50×50 $mm^2$ of the sample, along the thickness direction, at a movement rate equal to 0.1 mm/min. The load is increased until the thickness of the sample is reduced by half (therefore by 5 mm). The resistance to compressive crushing is equal to the load obtained expressed in Newtons divided by the surface area over which said load is applied (in the present case 25 $cm^2$).

Preferably, the CMC has a melting or sublimation temperature above 600° C., preferably above 1000° C. Advantageously, it does not need to be cooled during use as a result.

The CMC is preferably made of one or more of the following oxides or non-oxides: $Al_2O_3$, $ZrO_2$, $HfO_2$, $Cr_2O_3$, MgO, CaO, $SiO_2$, SiC, $Si_3N_4$, SiAlON, AlN, $Si_2ON_2$, BN, $B_4C$, silicon oxycarbide, $MoSi_2$, carbon C, in particular in the form of amorphous carbon, graphite or graphene. It is then particularly resistant to thermal degradation.

Preferably, more than 90% of the mass, preferably more than 95% of the mass, preferably more than 98% of the mass, preferably more than 99% of the mass, preferably more than 99.5% of the mass of the CMC is made up of oxides.

In particular and preferably, the sum of the amounts of $Al_2O_3$, $SiO_2$, $ZrO_2$, CaO, $Na_2O$, MgO, $K_2O$, $TiO_2$, $Fe_2O_3$, $HfO_2$, $Cr_2O_3$, $P_2O_5$ and $Y_2O_3$, or "$Al_2O_3+SiO_2+ZrO_2+CaO+Na_2O+MgO+K_2O+TiO_2+Fe_2O_3+HfO_2+Cr_2O_3+P_2O_5+Y_2O_3$", in percentage by mass based on the oxides of the CMC, is preferably greater than 80%, preferably greater than 85%, preferably greater than 90%, or even greater than 95%.

In one embodiment, the CMC has a chemical composition, in percentage by mass based on the oxides, such that $Al_2O_3+SiO_2+ZrO_2+CaO+Na_2O+MgO+K_2O+TiO_2+Fe_2O_3+Hf_2+P_2O_5+Y_2O_3>85\%$, preferably greater than 90%, or even greater than 95%. Preferably, it has a chemical composition, in percentage by mass based on the oxides, such that the total content $Al_2O_3+SiO_2+ZrO_2+CaO+Na_2O+MgO+K_2O+TiO_2+Fe_2O_3+HfO_2$, in percentage by mass based on the oxides, is greater than 80%, preferably greater than 85%, preferably greater than 90%, or even greater than 95%. Preferably, it has a chemical composition, in percentage by mass based on the oxides, such that the total content $Al_2O_3+SiO_2+ZrO_2+CaO+HfO_2$ is greater than 80%, preferably greater than 85%, preferably greater than 90%, or even greater than 95%.

In one embodiment, the CMC has a chemical composition, in percentage by mass based on the oxides, such that $Al_2O_3+SiO_2>80\%$, preferably greater than 85%, preferably greater than 90%, or even greater than 95%.

In one embodiment, the CMC has the following chemical analysis, as percentages by mass based on the oxides, and for a total of 100%:

$SiO_2$: 47%-67%, $Al_2O_3$: 32%-52%, oxide species apart from $Al_2O_3$ and $SiO_2$: <5%, preferably <4%, preferably <3%, preferably <2%.

Fibers of the CMC

Preferably, the volume of the fibers represents more than 25%, preferably more than 30%, preferably more than 40%, preferably more than 50%, preferably more than 60% and/or less than 70% of the volume of the material of the CMC, that is to say without taking into account its porosity, the total to 100% being made up of the ceramic matrix binding said fibers to one another.

The diameter of the fibers, measured halfway along the fibers and on average over all the fibers, is between 3 and 30 micrometers, preferably between 5 and 25 micrometers.

The fibers are preferably combined to form yarns. Each yarn comprises preferably more than 10, preferably more than 50, preferably more than 100 fibers, preferably several hundred to several thousand fibers. The fibers, preferably the yarns, are preferably continuous, and have a length greater than 50 mm, or even greater than 100 mm, or even greater than 1 m, greater than 10 m, greater than 100 m or even greater than 1000 meters. In one embodiment, the fibers, preferably the yarns are arranged in the form of a textile, in particular a woven, nonwoven, knitted or braided textile.

The fibers of the CMC comprise, preferably are ceramic fibers. Preferably, the fibers are selected from fibers of which more than 95%, preferably more than 98%, preferably more than 99%, preferably substantially 100% of the mass is composed of alumina, fibers of which more than 95%, preferably more than 98%, preferably more than 99%, preferably substantially 100% of the mass is composed of silica, fibers preferably of which more than 95%, preferably more than 98%, preferably more than 99%, preferably substantially 100% of the mass is composed of amorphous silica, fibers of which more than 95%, preferably more than 98%, preferably more than 99%, preferably substantially 100% of the mass is composed of mullite, and fibers of which more than 95%, preferably more than 98%, preferably more than 99%, preferably substantially 100% of the mass is composed of glass, preferably leached glass.

Advantageously, the CMC then has enough mechanical strength to resist impacts, and enough stiffness to be handled easily and joined to the refractory part without deforming.

Preferably, the fibers are made of an oxide material preferably comprising more than 50%, preferably more than 60%, or even more than 70%, or even more than 80%, or even more than 90% by mass of $Al_2O_3$ and/or $SiO_2$ and/or $ZrO_2$, in percentage by mass based on the oxides.

The fibers may also, at least partially, be made of a non-oxide material, for example SiC, another carbide, a nitride or an oxynitride.

Preferably, the fibers made of a non-oxide material are selected from SiC fibers, for example Nicalon® fibers, grades NL, Hi or Hi-S.

Matrix of the CMC

The ceramic matrix, or "binding phase", of the CMC may comprise, in percentage by mass, more than 80%, more than 90%, more than 95%, or even substantially 100% of one or more compounds selected from the group formed of SiC a or B, silicon oxycarbide, carbon C, in particular in the form of amorphous carbon, graphite or graphene, $Si_3N_4$, AlN, silicon oxynitrides including SiAlON and $Si_2ON_2$, boron nitride BN, boron carbide $B_4C$, and molybdenum disilicide $MoSi_2$.

Preferably, more than 90%, preferably more than 95%, preferably more than 99%, of the matrix is composed of oxides, in percentage by mass. Preferably, the matrix of the CMC is composed substantially entirely of oxides.

In one embodiment, more than 80%, more than 90%, more than 95%, preferably substantially 100% of the mass of the matrix comprises, preferably is made up of, one or more compounds selected from the group formed by $Al_2O_3$, $ZrO_2$, $Cr_2O_3$, MgO, CaO and $SiO_2$.

The matrix preferably comprises $Al_2O_3$ and/or $SiO_2$, preferably $Al_2O_3$ and $SiO_2$. The total content of $Al_2O_3$ and $SiO_2$ is preferably greater than 80%, preferably greater than 85%, preferably greater than 90%, preferably greater than 95%, in percentage by weight based on the oxides of the matrix. Preferably, the $Al_2O_3$ content in the matrix, in percentage by mass based on the oxides of the matrix, is greater than 60%, preferably greater than 65%, preferably greater than 70% and/or the $SiO_2$ content in the matrix, in percentage by mass based on the oxides of the matrix, is greater than 15%, preferably greater than 20% and/or less than 35%, preferably less than 30%. Preferably, the content of oxides other than $Al_2O_3$ and $SiO_2$ in the matrix, in percentage by mass based on the oxides of the matrix, is less than 3%, preferably less than 2%, preferably less than 1%.

In one embodiment, the silica of the matrix is amorphous.

Sensor

The instrumented plate comprises one or more sensors 312.

In FIGS. 3 and 6 to 9, the sensors have been shown in dashed line. They are not shown in the other figures.

The sensor 312 may be any known sensor. It makes it possible to physically measure an optical, electrical or acoustic signal. It is preferably selected from a thermocouple, a piezoelectric sensor, a stress gauge, an optical fiber, an ultrasonic wave propagation fiber, and an acoustic sensor.

Preferably, the sensor is a temperature sensor, for example a thermocouple or an optical fiber with a Bragg grating. The sensor may also be a deformation sensor as described, for example, in WO2017/009256.

According to a particularly advantageous embodiment, the sensor 312 takes the form of a wire or an assembly of wires, which is attached to the support plate 310 or incorporated in the support plate 310, preferably incorporated in the CMC of the support plate 310.

According to a first particular embodiment, as illustrated in FIG. 10, the sensor is attached to the support plate 310 by means of an interfacing layer 313. The interfacing layer may be, in particular if the temperature of the face of the refractory part that receives the instrumented plate, in particular the cold face, is less than or equal to 400° C., an adhesive comprising a thermosetting polymer, thermoplastic polymer, or crosslinkable elastomer. Preferably, when the polymer is a thermosetting polymer, its degree of crosslinking is greater than 75%, or even greater than 90%. Preferably, when the polymer is thermoplastic, its degree of crystallinity varies from 0% to 80%. Also preferably, the adhesive comprises more than 50% by mass of polymer(s), for example polyurethane or epoxide. If the use temperature is greater than or equal to 400° C., the interfacing layer is preferably an inorganic adhesive, for example a geopolymer-based adhesive, for example comprising sodium silicate, or for example a platinum- or copper-based adhesive, or else for example a refractory adhesive described in the article R. Luhn, E. Zimmermann und G. Köhler, Jena "*Anorganische Hochtemperaturklebstoffe—Anwendungsmöglichkeiten und Grenzen*" [Inorganic high-temperature adhesives—possible applications and limitations" in "*Schweiβen und Schneiden* 2000 *Vorträge der gleichnamigen Groβen Schweiβtechnischen Tagung in Nürnberg vom* 27. *bis* 29. September 2000" [Welding and cutting 2000: papers from the eponymous Major Welding Technology Conference in Nuremburg from 27 to 29 Sep. 2000], pages 249 to 252, for example a Pyro-Putty #653 or 2400 ceramic adhesive from Aremco. The thickness of the interfacing layer is preferably constant, preferably greater than 0.1 mm and/or less than 2 mm, preferably less than 1 mm. Generally, the behavior of an adhesive can be modified by adjusting its composition, for example by modifying the amount of organic materials it contains (thermosetting polymers, thermoplastic polymers, or crosslinking elastomers), accelerating agents, retarders or plasticizers. It is also possible to fill it, in particular with an filler made of elastomer or consisting of polymer or mineral fibers.

According to a second embodiment, the sensor is secured or attached to the support plate 310 by means of refractory tapes, clips or wires. It is notably possible to use aluminum tape, or Inconel metallic wire, or even platinum wire, depending on the maximum temperature reached by the face of the refractory part that receives the instrumented plate.

According to a third embodiment, the sensor, which is wired or not wired, is integrated within the support plate 310, in particular within the CMC of the support plate 310. As illustrated in FIG. 9, the instrumented plate 300 may for example comprise two elementary layers 310*a* and 310*b*, for example in the form of textiles, preferably woven fabrics, which are superposed one on the other and between which the sensor 312 is disposed. The two elementary layers may be joined to one another by clips or during sintering to form the CMC. They may in particular form a receiving recess for the sensor (for example a thermocouple), for example in the form of a pocket, a tube open at its two ends, an envelope open at one of its ends or a shell.

FIG. 7 illustrates an embodiment in which a pocket 314 has been created in the center of a set of rectangular orifices 304. The sensor 312 is disposed inside the pocket 314.

A single one of the, or preferably the two, elementary layers is/are CMCs, of the type described above, preferably ceramic-matrix textiles. Preferably, at least one, preferably each, of the two elementary layers has a thickness greater than 2 mm, preferably greater than 3 mm, preferably greater than 5 mm and/or less than 10 mm.

According to a fourth embodiment, the sensor is accommodated in a refractory sheath 316 incorporated in the support plate 310 while it is being fabricated, or in a channel formed during or after fabrication of the support plate 310.

According to a fifth embodiment, the fibers of the CMC are arranged in the form of a textile, preferably a woven fabric, and the sensor, preferably in wired form, is incorporated in the textile, the ceramic matrix of the CMC preferably being formed by sintering as the temperature of the furnace rises. This embodiment requires a matrix composition which allows consolidation by firing at a temperature below 800° C.

According to a sixth embodiment, the fibers of the CMC are arranged in the form of a textile, preferably a woven fabric, and the sensor, preferably in wired form, is incorporated in the textile before coating by the matrix and sintering at a temperature of at least 800° C.

In particular, the fibers of the CMC may be arranged in the form of a knit, a woven fabric or a braid, and the wired sensor may be knitted or woven or braided during fabrication of said knit, said woven fabric or said braid.

The whole formed by both the knit, the woven fabric or the braid of the CMC and the sensor is then partially or completely covered with the ceramic matrix. Advantageously, the matrix thus acts as protection for the sensor. The sensor is selected to resist the step of coating and firing the ceramic matrix. This embodiment is particularly suitable in the event of wired or ceramic sensors.

The incorporation of a wired sensor in the support plate can be realized in a preferred plane, preferably along a preferred direction or in a particular pattern.

The instrumented plate may comprise multiple sensors, for example:

- multiple temperature sensors, for example two different networks of optical fibers;
- one temperature sensor and one deformation sensor.

The sensors may all be disposed against two of the same textiles, or between different textiles.

Measuring Appliance

The measuring appliance 320, which is only shown in FIG. 3, is intended to control the sensor 312, in particular to receive and interpret the signal emitted by the sensor.

The measuring appliance 320 may be connected to the sensor by means of wires 322, for example connecting it to connection terminals 324 integrated in the instrumented plate 300. For the sake of clarity, the "sensor" 312 is considered to then comprise the component which picks up the signal to be measured, conventionally a transducer, and the electric lines which connect this component to the connection terminals 324.

Preferably, the wires and the connection terminals are made of a refractory metal which is resistant above 400° C., for example platinum. A refractory and conductive adhesive based on platinum can be used to improve the electrical contacts.

In a preferred embodiment, the measuring appliance 320 is not connected to the sensor 312. The sensor may in particular define a loop for contactless measurement, by induction.

The measuring appliance conventionally comprises a processor, a computer memory and software that are configured to determine, on the basis of the signal received from the sensor, a property relating to the state of the refractory part, for example the mean temperature or a temperature distribution or a mean residual thickness or a residual thickness distribution.

Any conventional measuring appliance can be used. Notably, the processing, analysis and recording of the electrical property measured by the sensor and its variations can utilize amplification, filtering, multiplexing and digitization means known to those skilled in the art in the field of sensors.

The communication between the sensor and the measuring appliance can be realized in wired or wireless fashion, for example by WiFi or Bluetooth®.

Preferably, the measuring appliance is programmed to record the signal from the sensor at regular intervals.

Heating-Cooling

The furnace may comprise a cooling system, for example a water or air tank, disposed so as to cool the face which receives the instrumented plate, in particular the cold face, and/or the instrumented plate. Preferably, the instrumented plate is disposed between the cold face of the refractory part and the cooling system.

Preferably, the main aim of the cooling system is to cool the cold face of the refractory part, the sensor being protected by the ceramic matrix.

The furnace may also comprise a heating device, for example a heating resistor. Such heating can be useful to limit thermal shocks and heat gradients in the thickness of the refractory part.

Fabrication

The refractory part and the instrumented plate may be fabricated by any conventional fabrication method.

The method for fabricating the instrumented plate may in particular comprise the following steps:

- disposing, around the fibers, a slurry capable of forming a ceramic matrix after consolidation, for example by impregnation of one or more woven fabrics or mats, preferably woven fabrics or mats of yarns, preferably ceramic yarns;
- if multiple woven fabrics or mats have been impregnated, layering said woven fabrics and/or mats, it being possible for said layering to be realized by pressing, or vacuum forming,
- consolidating, preferably by drying and/or sintering, so as to form said matrix.

The fabrication of the slurry is well known to those skilled in the art. The slurry is conventionally a suspension, for example of an aqueous base or organic solvent, containing

- ceramic particles and/or ceramic-particle precursors, that is to say compounds that transform into ceramic particles during fabrication of the CMC, and in particular during heating, and
- optionally dispersants, plasticizers, lubricants, and/or temporary binders.

The composition of the slurry, the ceramic particle or ceramic precursor size distribution and the mineral filler of the slurry are adapted to the type of fibers and the shaping technique. For example, the slurry may be disposed around or on the fibers, notably in the form of a direct lamination, by infusion, injection, infiltration or deposition, under atmospheric pressure or under higher pressure or by vacuum forming, at ambient temperature or at a higher temperature.

The consolidation may possibly be carried out in situ, that is to say when the furnace is started up after application to the refractory part, for example and in particular to the cold face of a refractory block.

The one or more sensors may be attached rigidly to the woven fabric or to the mat or to the layered arrangement of woven fabric(s) and/or mat(s) before or after said drying and/or sintering.

The woven fabrics or the mats can be layered such that the yarns of the various woven fabrics or mats substantially all exhibit the same direction, or different directions, for example at 45°, notably depending on the mechanical properties that are sought. The layering can also be performed on a stiff support having the profile of the surface of the cold face of the refractory part in order to obtain a support plate 310 having a profile close to that of said surface.

The perforated surface can be obtained by any technique known to those skilled in the art. In particular, orifices can be made by drilling or waterjet cutting, for example on the CMC obtained after sintering. The orifices can also be made on the assembly of fibers of the CMC, in particular on a textile, preferably a woven fabric, before coating by the matrix.

The shape of the instrumented plate is preferably designed to closely follow the face of the refractory part that receives it. This shape can be conferred before the matrix is cured, or after the matrix is cured, for example by machining or by deformation.

In one embodiment, the refractory part and/or the support plate, or even the instrumented plate, are disposed in the use position in the green state, that is to say before having been sintered. The refractory part is preferably in the form of a concrete part. The sintering of the refractory part and/or of the support plate, or even the instrumented plate, is then performed in situ in the furnace. Preferably, the ceramic matrix of the CMC is formed by sintering as the temperature of the furnace rises.

In one embodiment, the instrumented plate is attached to a refractory block before said refractory block is assembled in the furnace. The invention thus relates to a refractory block to which is attached an instrumented plate according to the invention, before it is assembled in the furnace.

The instrumented plate may be attached to a cold face.

It may also be disposed between facing faces of adjacent refractory blocks. FIG. 12 illustrates an example in which an instrumented plate 3001 according to the invention is disposed between horizontal faces of two superposed refractory blocks B1 and B2, and an instrumented plate 3002 according to the invention is disposed between vertical faces of two side-by-side refractory blocks B2 and B3. The instrumented plates 3001 and 3002 may be kept in position by the compression exerted by the refractory blocks between which they extend.

Of course, the invention is not limited to the detailed description above, which is provided only by way of illustration. It also goes without saying that the embodiments described are only examples and that they could be modified, notably by substituting technical equivalents, without departing from the scope of the invention.

In particular, the presence of the orifices passing through the support plate is particularly advantageous, but the invention is not limited to this embodiment. In particular, in addition to the orifices or alternatively, the support plate may have a very small thickness, thereby advantageously also increasing the deformability of the instrumented plate and limiting the insulating effect of the instrumented plate. The thickness may in particular be greater than 1 mm and less than 20 mm, preferably less than 10 mm, or preferably less than 5 mm.

Furthermore, in certain applications, it may be useful for the CMC to contribute to the thermal insulation of the cold face of the refractory part. Preferably, it has a thermal conductivity preferably less than 2.0 $W \cdot m^{-1} \cdot K^{-1}$, preferably less than 1.8 $W \cdot m^{-1} \cdot K^{-1}$, preferably less than 1.5 $W \cdot m^{-1} \cdot K^{-1}$, preferably less than 1.3 $W \cdot m^{-1} \cdot K^{-1}$, preferably less than 1 $W \cdot m^{-1} \cdot K^{-1}$, preferably less than 0.9 $W \cdot m^{-1} \cdot K^{-1}$, preferably less than 0.8 $W \cdot m^{-1} \cdot K^{-1}$, preferably less than 0.7 $W \cdot m^{-1} \cdot K^{-1}$, preferably less than 0.6 $W \cdot m^{-1} \cdot K^{-1}$, preferably less than 0.5 $W \cdot m^{-1} \cdot K^{-1}$ between 20° C. and 500° C., preferably between 20° C. and 600° C., preferably between 20° C. and 700° C., preferably between 20° C. and 800° C., preferably between 20° C. and 900° C., preferably between 20° C. and 1000° C.

The invention claimed is:

1. An instrumented plate intended for the monitoring of a refractory part of a furnace, the instrumented plate comprising:

- a support plate through which a plurality of orifices pass and which is at least partially made of a material of fibers interconnected by a ceramic matrix, referred to as "ceramic-matrix composite", or of a precursor of said ceramic-matrix composite;
- a sensor borne by said support plate,
- the ceramic-matrix composite precursor being a material which is capable of transforming into said ceramic-matrix composite under the effect of heating.

2. The instrumented plate as claimed in claim 1, wherein each of said orifices has an equivalent diameter greater than 3 mm and/or less than 50 mm; and the percentage of perforation, equal to the ratio of the cumulative surface area of the orifices, or "perforated surface area", to the surface area of the support plate, said surface area including the perforated surface area, is greater than 5% and less than 95%, and the sensor is a sensor for measuring an optical, electrical or acoustic signal, and the support plate has a thickness of between 1 and 20 mm.

3. The instrumented plate as claimed in claim 2, wherein said percentage of perforation is greater than 50%.

4. The instrumented plate as claimed in claim 1, wherein the orifices are evenly distributed in at least one perforated zone of the support plate.

5. The instrumented plate as claimed in claim 4, wherein the support plate has several of said perforated zones and at least one reinforcing zone separating two of said perforated zones, the reinforcing zone having a width greater than the largest dimension of said orifices.

6. The instrumented plate as claimed in claim 1, wherein the sensor is

- embedded within the ceramic-matrix composite or the precursor of said ceramic-matrix composite, or
- integrated in the arrangement of fibers of the ceramic-matrix composite or of the precursor of said ceramic-matrix composite, or
- accommodated in a recess formed or inserted in the ceramic-matrix composite or the precursor of said ceramic-matrix composite, or
- attached to a large face of the support plate.

7. The instrumented plate as claimed in claim 1, wherein the ceramic-matrix composite or the ceramic-matrix composite precursor comprises a plurality of superposed textiles, one or more identical or different sensors being inserted between two of said textiles.

8. The instrumented plate as claimed in claim 1, wherein

- the fibers represent more than 25% and less than 70% of the volume of the ceramic-matrix composite, and
- the ceramic-matrix composite comprises, in percentage by mass, more than 80% of one or more of the following oxides or non-oxides: $Al_2O_3$, $ZrO_2$, $HfO_2$, $Cr_2O_3$, MgO, CaO, $SiO_2$, SiC, $Si_3N_4$, SiAlON, AlN, $Si_2ON_2$, BN, $B_4C$, silicon oxycarbide, $MoSi_2$, and carbon C.

9. The instrumented plate as claimed in claim 1, wherein the ceramic-matrix composite has a resistance to compressive crushing of greater than 5 MPa, and/or a thermal conductivity between 20° C. and 500° C. of greater than 2.0 $W \cdot m^{-1} \cdot K^{-1}$.

10. A measuring device comprising the instrumented plate as claimed in claim 1 and a measuring appliance communicating with the sensor so as to receive and interpret a signal emitted by the sensor.

11. A furnace selected from a glass melting furnace, a metallurgical furnace, an incinerator, a gasifier, a combustion chamber for energy generation, and a gas reforming installation for the chemical industry, said furnace comprising:

- the refractory part, and
- the measuring device as claimed in claim 10, the instrumented plate of the measuring device being disposed in contact with one face of the refractory part.

12. The furnace as claimed in the claim 11, wherein the refractory part has a face configured to be at a temperature greater than 800° C., referred to as hot face, and a face facing away from said hot face, referred to as cold face, said one face of the refractory part being said cold face, the instrumented plate being disposed in contact with said cold face.

13. The furnace as claimed in claim 11, wherein the coefficient of thermal expansion of the ceramic-matrix composite is equal to that of the material of the refractory part plus or minus 20%.

14. The furnace as claimed in claim 11, wherein the instrumented plate is attached to the refractory part so as to not exert thermomechanical stresses on the refractory part under the effect of a dimensional modification of the refractory part resulting from normal operation of the furnace.

15. The furnace as claimed in claim 11, wherein the surface area of the instrumented plate represents more than 20% of the surface area of the face of the refractory part to which it is applied.

16. The furnace as claimed in claim 11, wherein the refractory part is selected from the following:

a throat lintel or block,
a soldier block,
a refractory brick or sidewall block,
a corner block,
a tuckstone,
a paving tile or pavement,
a crown brick or beam,
a tuyere surround brick or block,
a brick for a tapping hole or spout,
an electrode block,
an injector block,
a refractory spout-lip for a glass furnace,
a block for an injector,
a glass furnace throat,
a component for a heat exchanger of the furnace,
a refractory tile or plate for a boiler lining,
a protective shell for a heater tube for an incinerator,
a tile of an incinerator,
a ceramic component for a solar absorber,
a protective component or tile for a turbine combustion chamber,
a block or surround for a tuyere or a burner.

17. The furnace as claimed in claim 11, wherein the measuring device uses the signal it receives from the sensor to provide information relating to the thickness of the refractory part, or
the mean temperature in the furnace, or
the physical state of the refractory part.

* * * * *